United States Patent
Duchateau et al.

(10) Patent No.: US 9,617,414 B2
(45) Date of Patent: Apr. 11, 2017

(54) POLYMER COMPOSITION

(71) Applicants: SAUDI BASIC INDUSTRIES CORPORATION, Riyadh (SA); SABIC Global Technologies B.V., Bergen op Zoom (NL)

(72) Inventors: Robbert Duchateau, Eindhoven (NL); Maria Soliman, Schalbruch (DE); Johannes Peter Antonius Martens, Elsloo (NL); Renate Tandler, Ulestraten (NL); Mark Petrus Franciscus Pepels, Eindhoven (NL)

(73) Assignees: SAUDI BASIC INDUSTRIES CORPORATION, Riyadh (SA); SABIC GLOBAL TECHNOLOGIES B.V., Bergen Op Zoom (NL)

( * ) Notice: Subject to any disclaimer, the term of this patent is extended or adjusted under 35 U.S.C. 154(b) by 0 days.

(21) Appl. No.: 14/896,963

(22) PCT Filed: Jun. 10, 2014

(86) PCT No.: PCT/EP2014/061992
§ 371 (c)(1),
(2) Date: Dec. 9, 2015

(87) PCT Pub. No.: WO2014/202427
PCT Pub. Date: Dec. 24, 2014

(65) Prior Publication Data
US 2016/0160043 A1 Jun. 9, 2016

(30) Foreign Application Priority Data
Jun. 20, 2013 (EP) .................... 13173037

(51) Int. Cl.
| | | |
|---|---|---|
| C08G 63/02 | (2006.01) | |
| C08L 67/04 | (2006.01) | |
| B32B 27/08 | (2006.01) | |
| B32B 27/32 | (2006.01) | |
| B32B 27/36 | (2006.01) | |
| C08J 5/18 | (2006.01) | |
| C08L 23/06 | (2006.01) | |

(52) U.S. Cl.
CPC .............. *C08L 67/04* (2013.01); *B32B 27/08* (2013.01); *B32B 27/32* (2013.01); *B32B 27/36* (2013.01); *C08J 5/18* (2013.01); *C08L 23/06* (2013.01); *B32B 2439/70* (2013.01); *C08J 2323/06* (2013.01); *C08J 2367/04* (2013.01)

(58) Field of Classification Search
CPC ............................ C08L 67/04; B32B 27/08
USPC ......... 525/165, 418, 420, 425; 528/271, 272
See application file for complete search history.

(56) References Cited

U.S. PATENT DOCUMENTS

| | | |
|---|---|---|
| 3,405,198 A | 10/1968 | Rein |
| 2012/0136134 A1 | 5/2012 | Van Der Meulen et al. |

FOREIGN PATENT DOCUMENTS

| | | | |
|---|---|---|---|
| CA | 2362563 | * 9/2000 | .............. C08L 23/10 |
| EP | 0533304 A1 | 3/1993 | |
| EP | 2123699 B1 | 11/2009 | |
| WO | 9007550 A1 | 7/1990 | |
| WO | 2004081020 A1 | 9/2004 | |

OTHER PUBLICATIONS

Florian Stempfle et al., Long-chain aliphatic polyesters from plant oils for injection molding, film extrusion and electrospinning, Green Chem., 2014, 16, 2008-2014.*
Bouyahyi, Miloud, et al., "ω-Pentandecalactone Polymerization and ω-Pentadecalactone/ε-Caprolactone Copolymerization Reactions Using Organic Catalyst", Macromolecules 2012, 45, 3356-3366.
Cameron, Paul A. et al., "Pendant arm Schiff base complexes of aluminium as ethylene polymerisation catalysts", Chem. Commun. 1999, 18, 1883-1884.
Cameron, Paul A. et al., "Synthesis and characterisation of neutral and cationic alkyl aluminium complexes bearing N,O-Schiff base chelates with pendant donor arms", J. Chem. Soc., Dalton Trans. 2002, 3, 415-422.
Chen, Hsuan-Ying et al., "Ring-Opening Polymerization of Lactides Initiated by Zinc Alkoxides Derived from NNO-Tridentate Ligands", Macromolecules 2006, 39, 3745-3752.
Darensbourg, Donald J. et al., "Ring-Opening Polymerization of Cyclic Monomers by Biocompatible Metal Complexes. Production of Poly(lactide), Polycarbonates, and Their Copolymers", Macromolecules 2007, 40, 3521-3523.
Fokou, Patrice A., et al., "Studying and Suppressing Olefin Isomerization Side Reactions During ADMET Polymerizations", Macromol. Rapid Commun. 2010, 31, 368-373.
Hunsicker, David M., et al., "Synthesis of High Moiecular Weight Polyesters via in Vacuo Dehydrogenation Polymerization of Diols", Macromol. Rapid Commun. 2012, 33, 232-236.
Liu, Chen, et al., "Polymers from Fatty Acids: Poly(ω-hydroxyl tetradecanoic acid) Synthesis and Physico-Mechanical Studies", Biomacromolecules 2011, 12, 3291-3298.

(Continued)

*Primary Examiner* — Terressa Boykin
(74) *Attorney, Agent, or Firm* — Cantor Colburn LLP (57) ABSTRACT

The invention is directed to a polymer composition including a polyolefin and a polyester containing first repeating units of general structure

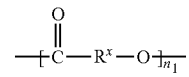

wherein $R^x$ is an organic group having a chain length of at least 8 atoms, $n_1$ is the number of first repeating units in the polyester. Such polymer composition is homogeneous and may be used as an alternative for pure polyolefin showing improved printability and oxygen permeability.

20 Claims, 2 Drawing Sheets

(56) References Cited

OTHER PUBLICATIONS

Stempfle, Florian, et al., "Long-Chain Linear C19 and C23 Monomers arid Polycondensates from Unsaturated Fatty Acid Esters", Macromolecules 2011, 44, 4159-4166.

Trosch, Alexander et al., "Zinkkomplexe eines neuen N,N,O-Liganden", Z. Anorg. Allg. Chem 2004, 630, 2031-2034 (with English Abstract).

Trzaskowski, Justyna, et al., "Aliphatic Long-Chain C20 Polyesters from Olefin Metathesis" Macromol. Rapid Commun. 2011, 32, 1352-1356.

Van Der Meulen, Inge, et al., "Catalytic Ring-Opening Polymerization of Renewable Macrolactones to High Molecular Weight Polyethylene-like Pol", Macromolecules 2011, 44, 4301-4305.

International Search Report and Written Opinion for PCT/EP2014/061992 mailed Sep. 17, 2014, 8 pages.

Stempfle, Florian, et al.,"Which Polyesters Can Mimic Polyethylene?", Macromolecular Rapid Communications (2013) 34, 47-50.

* cited by examiner

POLYMER COMPOSITION

This application is a national stage application of PCT/EP2014/061992 filed Jun. 10, 2014, which claims priority to EP13173037.6 filed Jun. 20, 2013, which are hereby incorporated by reference in their entirety.

The present invention relates to a polymer composition comprising a polyolefin and a polyester its method of manufacture and its use.

Polyolefins are well known, readily available and relatively low cost materials used in a number of applications. Given their chemical structure polyolefins generally are considered as non-polar materials. Polyolefins such as polypropylene (PP) are used in many applications in the form of molded articles, film, sheets, etc., because these polymers are excellent in molding processability, toughness, moisture resistance and chemical resistance. In addition they generally have a relatively low density. However, polyolefins may not be suitable for applications requiring high oxygen barrier properties, heat resistance, high stiffness, impact resistance, and scratch resistance. Moreover polyolefins usually require a surface treatment, such as a corona or fluorine treatment, prior to coating or printing. Alternatively, polarity increasing additives may be added to a polyolefin. Such additives however may result in loss of mechanical or other preferred properties of the polyolefin and moreover may increase the cost of the final product.

Polyesters are likewise known and readily available materials and given their chemical structure containing ester functionalities these are generally considered as more polar materials. Polyesters, such as polyethylene terephthalate (PET), are widely used as engineering thermoplastics in the field of automobile parts, electrical and electronic parts, because such polyesters have high heat resistance, stiffness, strength, scratch resistance, oil resistance, solvent resistance, and the like. Given that polyesters are generally more polar than polyolefins coating or printing of polyester materials may be carried out without, or at least with less intense, surface treatment.

From this view point it would seem a useful approach to blend polyolefins and polyesters in order to obtain a thermoplastic resin that can be easily coated or printed and exhibits good mechanical properties, chemical resistance and heat resistance. EP 0533304 for example discloses thermoplastic blend comprising a polyolefin, a polyester, and an elastomer having functional groups which interact with the polyolefin and polyester to form a plastic alloy having the best properties of both polymers, good processability, improved surface appearance of the molded parts, and especially increased impact strength. This patent publication is silent with respect to printability of the final product and moreover requires the use of a third material, the elastomer, which adds cost to the final polymer blend.

WO 90/07550 discloses homogeneous polyester/polyolefin blend compositions characterized or containing: (i) 98 to 60 weight % of a copolyester having an inherent viscosity (I.V.) of 0.3 to 1.2 and containing repeat units from 100 mol % of an acid comprising at least one aromatic, saturated aliphatic or saturated cycloaliphatic dibasic acid having 4 to 36 carbon atoms and 0.5 to 20%, based on the weight of the polyester, of a functional polyolefin having a saponification number of 75 or less, wherein said functional polyolefin is the reaction product of at least one homopolymer or copolymer of an α-olefin having 2 to 10 carbon atoms and at least one unsaturated acid or anhydride having 3 to 5 carbon atoms or a 1 to 10 carbon atom alkyl ester thereof, and repeat units from 100 mol % of at least one aliphatic or cycloaliphatic glycol having 2 to 12 carbon atoms; (ii) 2 to 40 weight % of an unmodified polyolefin. This patent publication is silent with respect to printability of such compositions. Moreover a specific copolymer, referred to as copolyester, is required to obtain the homogeneous blend. The manufacture of such specific copolymer adds cost to the final polymer blend.

EP 2123699 discloses a heat-shrinkable film consisting of a layer or comprising at least one layer, wherein the layer is made of a mixed resin containing a polylactic acid resin and a polyolefin resin as the main components, wherein mass ratio of the polylactic acid resin and the polyolefin resin is 95/5 to 50/50 by mass, the polylactic acid resin being a copolymer of D-lactic acid and L-lactic acid or a mixed resin of the copolymer, wherein D/L ratio of D-lactic acid and L-lactic acid is 3/97 to 15/85 or 85/15 to 97/3, the storage elastic modulus (E') of the polyolefin resin or the soft acrylic resin at 20 degree C. being 100 M Pa or less as measured at an oscillation frequency of 10 Hz and a strain of 0.1%, the film being stretched in at least one direction, and the heat shrinkage ratio of the film in the main shrinking direction being 20% or more as measured after the film is immersed in hot water of 80 degree C. for 10 seconds. This document discloses that when the heat-shrinkable film made of polylactic acid is heated, crystallization is developed; thereby sufficient heat-shrinkable property cannot be obtained. As a means to solve inter alia this problem, a film made of polylactic acid resin in which copolymer ratio of L-lactic acid and D-lactic acid is adjusted is known.

US 2012/0136134 discloses a process for preparing a polyester, comprising providing an optionally substituted lactone having a ring size of from 6 to 40 carbon atoms; and subjecting said lactone to metal mediated ring-opening polymerization using as catalyst a compound according to general formula (I):

wherein
M is selected from the group consisting of Al, Ti, V, Cr, Mn and Co;
X and X are independently a heteroatom,
Y and Y' are independently selected from the group consisting of O, N, S, P, C, Si, and B,
Z is selected from the group consisting of hydrogen, borohydrides, aluminum hydrides, carbyls, silyls, hydroxide, alkoxides, aryloxides, carboxylates, carbonates, carbamates, amidos, thiolates, phosphides, and halides;
$L^1$ and $L^2$ are independently an organic ligand linking X and Y together and linking X' and Y' together, respectively, and
$L^3$ is an optional organic ligand linking Y and Y' together.

Polyesters and copolymers obtained with this process can be used in a wide variety of applications. Some non-limitative exemplary applications include the fabrication of fibers with high mechanical strength, biomedical applications including screws (such as for bone), scaffolding, sutures, drug delivery devices, etc. In addition, the polyesters and copolymers obtained by the process may be used as a general alternative for polyethylene.

U.S. Pat. No. 3,405,198 discloses a composition of polyethylene terephthalate and polyethylene by injection molding polyethylene terephthalate as a molten composition in which there has been homogeneously distributed from 0.5 to 50% by weight, preferably about 5 to 40% by weight, of finely divided polyethylene. The composition is obtained by using very fine polyethylene powder and/or using specific mixing conditions during injection moulding or compounding.

More recent development is directed to synthesis polyesters that can mimic polyethylene. In that respect Stempfle et al., Macromolecular Rapid Communications, 2013, 34, 47-50 discloses aliphatic polyesters that contain up to 44 methylene units between ester functionalities.

It is an object of the present invention to provide a polymer composition having, in comparison with polyolefins, good mechanical properties and improved printability.

It is a further object of the present invention to provide a polyolefin based polymer composition having, in comparison with polyolefins, good oxygen barrier properties.

It is a further object of the present invention to provide a polymer composition of a polyester and a polyolefin that does not require the use of a compatibiliser and/or chemical modification or functionalization of either or both the polyester and the polyolefin.

To that extent the present inventors surprisingly found that polyolefins may be functionalized by blending the polyolefins with a polyester of first repeating units having a general structure wherein
$R^x$ is an organic group having a chain length of at least 8 atoms,
$n_1$ is the number of first repeating units in the polyester.

Such polyesters are less polar compared to polyesters having less than 8 atoms between the ester units making the polyesters more compatible with the polyolefin and allowing a homogeneous composition of the polyolefin and the polyester without having an adverse effect on mechanical properties. At the same time the inclusion of ester units in the polymer composition makes the composition more polar resulting in an increased surface tension and as such improved ability to coat or print the material. The introduced polarity further opens up the possibility of adding other polar additives without the need for, or at least reducing the required amount of, a compatibiliser. In addition to the improved printability the barrier properties towards oxygen, when compared to polyolefins, is improved.

Hence by application of the present polymer composition one or more of the objectives of the present invention are met.

For the avoidance of doubt it should be understood that the polymer composition of the present invention is a homogeneous composition, meaning that the polyolefin and the polyester form a homogeneous mixture. Without willing to be strictly bound to it the present inventors believe that, for compositions comprising a major amount of polyolefin, the polyester of the present invention is on compatible with the polyolefin that once the materials are melt mixed, the polyester phase may be present in the form of very small domains, typically with dimensions less than the wavelength of visible light, so that readily transparent materials can be obtained. For compositions containing a major amount of polyester the situation may be the other way around, i.e. the polyolefin may be present in the form of very small domains, typically with dimensions less than the wavelength of visible light, so that readily transparent materials can be obtained. For examples, domains having a maximum diameter of from about 1 to 300 μm have been observed. In some embodiments the polyolefin and the polyester may also mix so well that the composition is mono-phasic.

Although chemically compatible, a viscosity mismatch between the polyester and the polyolefin may nevertheless result in a composition that is less homogeneous than expected. Therefore it is preferred that the melt flow index (MFI) of the polyolefin and the polyester are matched. More generally however homogeneous compositions can be obtained when the ratio of MFI between the polyolefin and the polyester is in the range from 0.33-3.0, such as from 0.5-1.5 or even 0.7-1.3. More preferably such ratio is from 0.9-1.1. The standard for measurement of the MFI is less relevant as long as the same is used for both the polyolefin as the polyester. For example, for polyethylene the MFI may be measured in accordance with ISO 1133 at a temperature of 190° C. and under a load of 2.16 kg It should be understood that the present polymer composition preferably does not contain and/or does not require, any compatibiliser for the purpose of compatibilising the polyolefin and the polyester as per prior art compositions. In addition the polyolefin and/or the polyester of the present composition do not require any chemical modification or functionalization for the purpose of being used in combination with each other.

It should further be understood that the polyester as defined herein is a semi-crystalline polyester, preferably having a crystallinity of at least 50% as determined with differential scanning calorimetry (DSC). Such materials are different from the or low crystalline (or amorphous) polylactic acid resin in the composition as disclosed in EP 2123699.

It should further be understood that the polymer composition is a thermoplastic polymer composition.

The amount of first repeating units, $n_1$, is at least 20, preferably at least 100, more preferably at least 500, 1000, or even at least 5000, depending on the desired molecular weight, viscosity and/or properties of the polyester. As a practical upper limit $n_1$ may be 10000.

The polyolefin of the present polymer composition may be a polymer of an α-olefin such as polyethylene, polypropylene, polybutylene. The polyolefin may also be a copolymer of two or more olefins. Preferably however the polyolefin is polyethylene or polypropylene, more preferably low density polyethylene (LDPE) or linear low density polyethylene (LLDPE).

With linear low density polyethylene (LLDPE) as used herein is meant a low density polyethylene copolymer comprising ethylene and a $C_3$-$C_{10}$ alpha-olefin co monomer (ethylene-alpha olefin copolymer). Suitable alpha-olefin co monomers include 1-butene, 1-hexene, 4-methyl pentene and 1-octene. The preferred co monomer is 1-hexene. Preferably, the alpha-olefin co monomer is present in an amount of about 5 to about 20 percent by weight of the ethylene-alpha olefin copolymer, more preferably an amount of from about 7 to about 15 percent by weight of the ethylene-alpha olefin copolymer. The (linear) low density polyethylene ((L)LDPE) has a density of from 915 kg/m³ to 940 kg/m³ preferably from 915 kg/m³ to 935 kg/m³. High density polyethylene (HDPE) has a density of from 940 to 965 kg/m³. With polypropylene as used herein is meant propylene homopolymer or a copolymer of propylene with an α-olefin, including both random copolymers as heterophasic copolymers.

In an embodiment the polyester in the polymer composition is a copolyester and further contains second repeating units of general structure wherein
$R^y$ is different from $R^x$ and is an organic group having a chain length of at least 1 atom,
$n_2$ is the number of second polyester units in the polyester,
$n_1$ and $n_2$ being selected such that the average chain length of $R^x$ and $R^y$ is at least 8 atoms.

The amount of second repeating units, $n_2$, is at least 20, preferably at least 100, more preferably at least 500, 1000, or even at least 5000, depending on the desired molecular weight and properties of the polyester. As a practical upper limit $n_2$ may be 10000.

The term copolyester as used herein means a copolymer of first and second (or further) repeating units. The copolyester may be a random copolyester, a gradient copolyester, an alternating copolyester, a block copolyester or a multi-block copolyester.

With a random copolyester is meant a copolyester wherein the first and second repeating units are randomly distributed. With a gradient copolyester is meant a copolyester wherein the distribution of the first and second repeating units along the polymer chain is such that the amount of first or second repeating units gradually increases or decreases relative to the other, as the case may be, towards the end of the polymer chain. With an alternating copolyester is meant a copolyester wherein the first and second repeating units alternate in the polymer chain. With a block copolyester is meant a copolyester having one or more polymer blocks of first repeating units and one or more polymer blocks of second repeating units.

Such a block copolyester may have any structure generally known for block copolymers and is preferably of the type selected from the group consisting of:
A-B di-block copolymer,
A-B-A or B-A-B tri-block copolymer,
$(A-B)_n$ block copolymer wherein n is an integer and from 2-20,
$(B-A)_n$ block copolymer wherein n is an integer and from 2-20,
$A(B-A)_n$ block copolymer wherein n is an integer and from 2 to 20,
$B(A-B)_n$ block copolymer wherein n is an integer and from 2 to 20,
wherein A represents a first block and B represents a second block.

In an embodiment where a block copolymer contains two or more A blocks these A blocks may be the some or different in length, i.e. may have the same or different molecular weight. Likewise in an embodiment where a block copolymer contains two or more B blocks these B blocks may be the same or different in length, i.e. may have the same or different molecular weight. For block copolymers it is preferred that both the first and second repeating units have a chain length of at least 8 atoms.

The (co)polyester in the polymer composition of the present invention may be a linear (co)polyester, a star type (co)polyester, such as a Y-type branched (co)polyester, an H-type branched (co)polyester and a comb type, or brush type, (co)polyester.

A Y-type branched (co)polyester is a (co)polyester that has three branches connected to one another at a central point. Such type of (co)polyester is a species of the more general term star type (co)polyester.

An H-type branched (co)polyester is a (co)polyester that has four branches connected to one another from a central linking group (or bridge). Such type of (co)polyester is a species of the more general term star type (co)polyester. The bridge may be a short hydrocarbon chain, for example having a chain length of from two to six carbon atoms, from which the four branches extend.

A comb or brush type (co)polyester is a (co)polyester that has a (linear) molecular chain as a backbone (the base of the comb or brush) from which a multitude of branches (the teeth of the comb or brush) extend.

A star type block copolymer is a (co)polyester that has a central point from which a multitude of branches extend.

The polyester in the polymer composition is not limited to a polyester homopolymer or a polyester copolymer of two different esters. In principle third or further repeating unit of structure similar to the first and second repeating units may be incorporated in the copolyester as long as the condition that the average chain length between the ester units is at least 8 atoms is fulfilled.

The atoms of the organic groups linking the ester units in the polyester, $R^x$ and/or $R^y$, and/or any third or further such linking groups and making up the chain length preferably are carbon atoms. In other words, the chain between two ester groups in the polyesters is preferably formed by carbon atoms. For the avoidance of doubt it is noted that the atoms directly neighbouring the ester functionalities are carbon atoms. If this were not the case the polymer of first and/or second repeating units would not be a polyester. The organic groups linking the ester units in the polyester. $R^x$ and/or $R^y$, and/or any third or further such linking groups are preferably straight or branched, optionally substituted, aliphatic chains. Hence, the organic groups preferably do not contain aromatic moieties. Even more preferably $R^x$ and/or $R^y$ and/or any further organic group is a saturated straight or branched, optionally substituted aliphatic chain.

The chain length of $R^x$ is at least 8 atoms. Preferably the chain length is at least 10 or at least 12 atoms. The chain length preferably is at most 100, such as at most 80 or at most 50. Preferred ranges for the chain length of $R^x$ are from 8 to 80 or from 10 to 50 or from 12 to 30.

Similarly the average chain length of the chains $R^x$ and $R^y$, or any third or further organic linking group is at least 8 atoms. Preferably the average chain length is at least 10 or at least 12 atoms. The maximum chain length is as indicated above for $R^x$ and the average chain length is preferably at most 80 or at most 50. Preferred ranges for the average chain length are from 8 to 80 or from 10 to 50 or from 12 to 30.

The term chain length as used herein refers to the shortest number of atoms between two ester functionalities (O=)C—O— in the repeating unit. Hence the "chain length" does not include any optional branches or side groups. For example, if $R^x$ is $(C_{10}H_{20})$ the chain length is ten. Similarly, if $R^x$ is $C_4H_8$—$C(CH_3)_2$—$C_5H_{10}$ the chain length is also ten.

In an embodiment the polyester is obtainable by the ring opening polymerisation of one or more cyclic esters having an a ring size of at least 10 atoms.

If the polyester is a copolyester said copolyester is preferably obtainable by the ring opening copolymerisation of two or more different cyclic esters having an average ring size of at least 10 atoms, so as to result in an average chain length of $R^x$ and $R^y$ of at least 8 atoms.

The term ring-size as used herein refers to the number of atoms that form the ring in the cyclic ester, including the atoms of the ester functionality. For example caprolactone has a seven membered ring, i.e. a ring size of seven atoms. The ring of caprolactone consists of six carbon atoms and one oxygen atom.

Preferably the cyclic esters have only one ester functionality in the ring and preferably are lactones which are cyclic esters having a single ester group in the ring. Examples of the cyclic esters include 11-undecalactone, 12-dodecalactone, 13-tridecalactone, 14-tetradecalactone, 15-pentadecalactone (or ω-pentadecalactone), globalide, 16-hexadecalactone, ambrettolide, 17-heptadecalactone, 18-octadecalactone, 19-nonadecalactone. Particularly preferred cyclic esters are pentadecalactone, 18-octadecalactone, 12-pentadecen-15-olide (known as globalide) and 7-hexadecen-16-olide (known as ambrettolide) in view of their commercial availability and/or ease of manufacture and good reactivity. Preferably the cyclic ester has only one ester functionality in the ring.

Examples of cyclic esters that may be used as basis for second or further repeating units in a copolyester include β-propiolactone, β-butyrolactone, 3-methyloxetan-2-one, γ-valerolactone, caprolactone, ε-caprolactone, ε-decalactone, 5,5-dimethyl-dihydro-furan-2-one, (S)-γ-hydroxymethyl-γ-butyrolactone, γ-octanoic lactone, γ-nonanoic lactone, δ-valerolactone, δ-hexalactone, -decalactone, -undecalactone, δ-dodecalactone, glycollide, lactide (L, D, meso), heptalactone, octalactone, nonalactone, decalactone. Particularly preferred cyclic esters are ε-caprolactone, ε-decalactone, β-butyrolactone, glycollide and lactide in view of their commercial availability and reactivity.

The mechanism and initiation of ring-opening polymerization is well known to the skilled person and is for instance described in "Handbook of Ring Opening Polymerization, 2009, Eds. Philippe Dubois, Olivier Coulembier, Jean-Marie Raquez, Wiley VCH, ISBN: 978 3 527 31953 4". Ring opening polymerisation of lactones may for example be carried out with the method as disclosed in WO 2012/065711 or any other method known in the art.

The polyester in the polymer composition according to the present invention is preferably selected from the group consisting of, poly(11-undecalactone), poly(12-dodecalactone), poly(13-tridecalactone), poly(14-tetradecalactone), polypentadecalactone, poly-globalide, poly(16-hexadecalactone), poly-ambrettolide, poly(17-heptadecalactone), poly(18-octadecalactone), poly(19-nonadecalactone) and more preferably is polypentadecalactone.

The polyester may however also be a copolymer of one or more first cyclic esters selected from the group consisting of 11-undecalactone, 12-dodecalactone, 13-tridecalactone, 14-tetradecalactone, 15-pentadecalactone, globalide, 16-hexadecalactone, ambrettolide, 17-heptadecalactone, 18-octadecalactone, 19-nonadecalactone and one or more second cyclic esters selected from the group consisting of ε-caprolactone, ε-decalactone, β-butyrolactone, glycollide and lactide. Such copolyesters may be random copolyesters, gradient copolyesters, alternating copolyesters, block copolyesters or multi-block copolyesters.

More in particular a copolyester may prepared by providing a first lactone having a for example first ring size from 4 to 11 atoms and a second lactone having a second ring size of for example from 12 to 40 atoms and subjecting the first and second lactone to ring-opening copolymerization using as catalyst a compound of formula III below formula III Wherein $Z=C_2H_5$

$R^1$, $R^2$, $R^3$ and $R^4$ are hydrogen and wherein in the process is carried out in p-xylene as a solvent and wherein hexadecanol is used as an initiating group. In an exemplary embodiment the polymerisation is carried out at a temperature of 100° C. under a nitrogen atmosphere. For one mole of lactone ten mmole of catalyst is used.

A polyester may further be prepared by providing a first cyclic ester having for example a ring size of from 12-40 atoms and subjecting the first cyclic ester to ring-opening polymerisation by contacting the first cyclic ester with a catalyst selected from the group consisting of -continued wherein said polymerisation may be carried out in toluene as a solvent under inert atmosphere at a temperature of about 100° C. optionally using benzyl alcohol as initiator or chain transfer agent.

A copolyester may be prepared in a similar manner either by adding two (or more) cyclic esters at the same time (one-pot synthesis) or by applying a sequential feed technique wherein a second cyclic ester is only added to the reaction mixture once a first cyclic ester has been converted to a desired degree. By selecting the catalysts based on zinc, calcium or magnesium the latter technique allows true block copolymers to be prepared. If the aluminium based catalyst is used some transesterification of the already formed polymer may result in a more random copolyester.

Further exemplary polyesters are those disclosed in the article of Stempfle et al, Macromolecular Rapid Communications, 2013, 34, 47-50. Such polyesters include polyester 26,26, polyester 38,23 and polyester 44,23.

The polymer composition of the present invention preferably contains from 5-95 wt %, more preferably from 20-80 wt % or 30-70 wt % of polyolefin and from 95-5 wt %, more preferably from 80-20 wt % or 70-30 wt % of polyester based on the total weight of the composition. The present inventors have found that at least for some of the polyester—polyolefin combinations homogeneous articles could be manufactured over the whole composition range. The composition may be prepared by conventional melt-mixing methods such as for example by means of extrusion. As such powders of the polyolefin, the polyester and optional additives are fed to an extruder and combined to form one or more melt strands which are cooled and cut to pellets using conventional techniques. Such pellets may then be used as raw material for end use conversion processes.

It is also possible that powders of the polyolefin and the polyesters are combined at the point of use, for example at a film blowing apparatus, where they are fed as a powder mixture to an extruder in which they are consequently melt mixed.

Generally a composition wherein the ratio of polyolefin to polyester is more than one is considered a polyolefin composition containing polyester whereas a composition wherein the ratio of polyolefin to polyester is less than one is considered a polyester composition containing polyolefin. For the purpose of the present invention this difference is not made and the composition is referred to as polymer composition. The effects of the present invention are presented herein starting from the viewpoint of polyolefins.

In addition to the polyolefin and the polyester the polymer composition may comprise reinforcing agents, such as glass or synthetic fibres, natural fibres, and talc, (UV) stabilisers, anti-oxidants, fillers, pigments, dyes, flame retardants, or any other additives as available to the skilled person.

The polymer composition of the present invention may be moulded to shaped articles using any method known in the art including injection moulding, compression moulding, extrusion moulding etc.

Preferably the polymer composition is used for the manufacture of films or sheet. A cast or blown film obtained from the polymer composition of the present invention may be laminated to other polyolefin or polyester films so as to prepare multi-layer films, suitable for packaging applications, in particular food packaging applications. However, a film of the polymer composition of the present invention may also be used as such.

The present invention will now be further explained based on the following examples and figure which should not be considered as limiting the presently claimed invention in any way.

Blends of polypentadecalactone (PPDL) and LDPE were prepared using a lab scale mini-extruder according to the Table 1 below. The LDPE was PE 2404TN00 Commercially available from Saudi Basic Industries Corporation and having a MFR of 4.2 g/10 min as measured in accordance with ISO 1133 (190° C./2.16 kg) and a tensile modulus of 250 MPa as measured in accordance with ISO 527-2/50 (1.10 mm, Compression Molded sample).

The PPDL was prepared on lab scale and was measured to have a number average molecular weight of 41564 g/mol and a weight average molecular weight of 109830 g/mol as determined using High Temperature Size Exclusion Chromatography at 160° C. using a Polymer Laboratories PLXT-20 Rapid GPC Polymer Analysis System (refractive index detector and viscosity detector) with 3 PLgel Olexis (300× 7.5 mm, Polymer Laboratories) columns in series, using 1,2,4-Trichlorobenzene as eluent at a flow rate of 1 mL·min$^{-1}$. The molecular weights were calculated with respect to polyethylene standards (Polymer Laboratories).

A melt flow rate was not determined for the PPDL, but based on a comparison with PE 2404TN00 using rheological data obtained with a rheometer the present inventors estimate such would be in the range from 2-3 g/10 min, under conditions of ISO 1133 (190° C./2.16 kg).

TABLE 1

| # | LDPE [wt %] | PPDL [wt %] | Temperature [° C.] | RPM |
|---|---|---|---|---|
| Ex. 1 | 100 | 0 | 170° C. | 25 |
| Ex. 2 | 90 | 10 | 170° C. | 100 |
| Ex. 3 | 70 | 30 | 170° C. | 100 |
| Ex. 4 | 50 | 50 | 170° C. | 100 |
| Ex. 5 | 30 | 70 | 170° C. | 100 |
| Ex. 6 | 10 | 90 | 170° C. | 25 |
| Ex. 7 | 0 | 100 | 170° C. | 25 |

After compounding in the mini-extruder, cast films were prepared from the polymer compositions. It was found that the cast film of Example 1 (pure LDPE) had the softest touch whereas upon increasing amounts of PPDL the films became more stiff. However upon visual inspection it appeared that the films were homogeneous and transparent from which it was concluded that the LDPE and PPDL could be well-mixed over the whole composition range.

Figure 1:
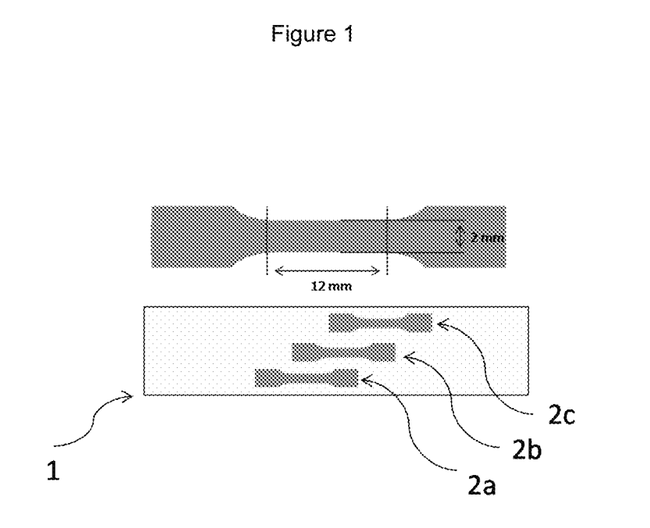
FIG. 1 shows the dimension of the tensile bars used in evaluation of polymer compositions.

With reference to FIG. 1, tensile bars 2a, 2b and 2c with a width of 2 mm, a parallel specimen length of 12 mm, and a varying thickness (dependent on the film thickness), were punched from the films 1. Per film 1, three tensile bars 2a, 2b, 2c were taken, of which the length was in the same direction as the length of the film. Tensile tests were done at room temperature using a Zwick Z100 testing machine equipped with a 100 N load cell. A preload force of 0.02 N and a strain rate of 10 mm/min was applied. The E modulus was determined within the first 0.5% of strain. Furthermore the maximum stress and strain at maximum stress were determined.

Measurement data is depicted in Table 2 below. Properties were measured at three positions in the film, referred to as left (L), middle (M) and right (R). It was observed that the measurement results differed to some extent depending on the position of where the sample was taken. The present inventors believe that this may have been caused by the varying levels of orientation at different positions in the film.

For the samples #2, #3 and #4 containing 50% or less PPDL, it can be seen that the middle samples (M) reaches the highest strain, probably caused by the lowest amount of orientation in the film at that position.

Figure 2:
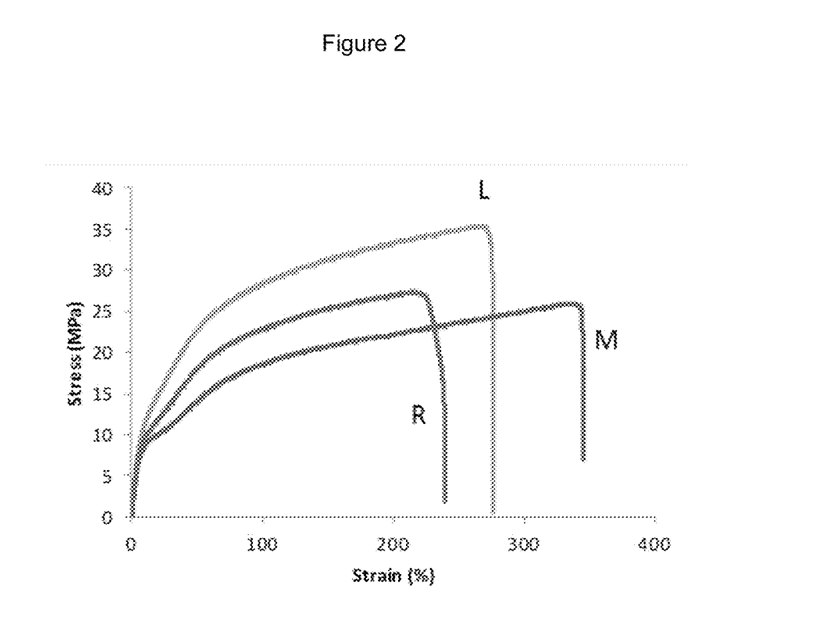
FIG. 2 shows a stress-strain curve measured on a film made with a polymer composition according to the present invention.
Figure 3:
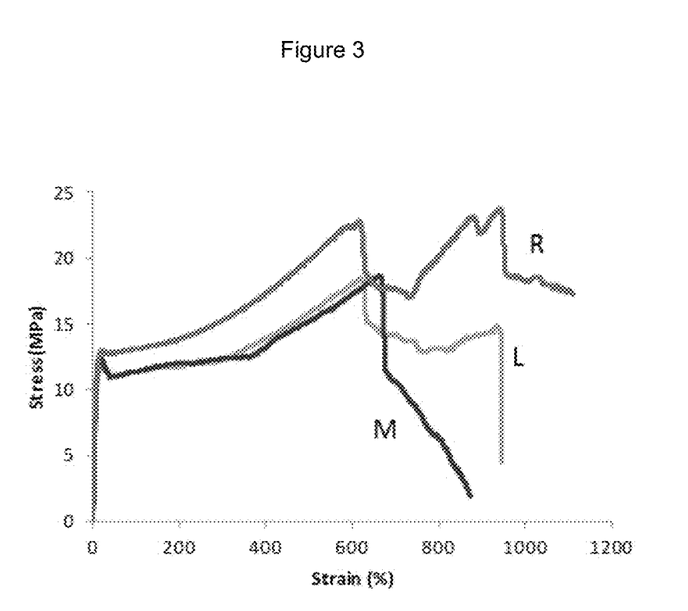
FIG. 3 shows a stress-strain curve measured on a film made with a polymer composition according to the present invention.

The influence of film thickness can also be observed when comparing the stress—strain curves of Examples 4a and 4b. FIG. 2 shows the stress—strain curve for Example 4a while FIG. 3 shows such curves for Example 4b. The samples taken from Example 4a show more or less similar deformation behavior as the samples with lower PPDL content, while the thicker samples taken from Example 4b show a yielding behavior accompanied by strain softening, which may be an indication of much less orientation in the film.

TABLE 2

| # | Thickness (μm) | LDPE [wt %] | PPDL [wt %] | Pos. | Emod (MPa) | Maximum Stress (MPa) | Strain Max Stress (%) |
|---|---|---|---|---|---|---|---|
| 1 | 35 | 100 | 0 | L | 140 | 23.96 | 124 |
|   | 35 | 100 | 0 | M | 142 | 24.81 | 142 |
|   | 25 | 100 | 0 | R | 211 | 34.60 | 102 |
| 2 | 27 | 90 | 10 | L | 227 | 29.94 | 118 |
|   | 31 | 90 | 10 | M | 221 | 29.60 | 193 |
|   | 28 | 90 | 10 | R | 150 | 30.01 | 162 |
| 3 | 28 | 70 | 30 | L | 167 | 33.84 | 189 |
|   | 32 | 70 | 30 | M | 144 | 26.63 | 294 |
|   | 28 | 70 | 30 | R | 193 | 29.66 | 171 |
| 4a | 23 | 50 | 50 | L | 227 | 35.39 | 268 |
|   | 31 | 50 | 50 | M | 191 | 25.94 | 335 |
|   | 28 | 50 | 50 | R | 251 | 27.33 | 213 |
| 4b | 190 | 50 | 50 | L | 213 | 18.43 | 618 |
|   | 220 | 50 | 50 | M | 249 | 18.63 | 663 |
|   | 110 | 50 | 50 | R | 255 | 23.77 | 941 |
| 5 | 38 | 30 | 70 | L | 220 | 31.21 | 399 |
|   | 45 | 30 | 70 | M | 256 | 28.98 | 449 |
|   | 44 | 30 | 70 | R | 232 | 33.41 | 482 |
| 6 | 38 | 10 | 90 | L | 186 | 32.76 | 513 |
|   | 37 | 10 | 90 | M | 341 | 34.96 | 659 |
|   | 37 | 10 | 90 | R | 299 | 36.74 | 558 |
| 7 | 40 | 0 | 100 | L | 624 | 37.03 | 377 |
|   | 41 | 0 | 100 | M | 533 | 37.73 | 464 |
|   | 47 | 0 | 100 | R | 597 | 54.00 | 633 |

The invention claimed is:

1. A polymer composition comprising a polyolefin and a polyester comprising first repeating units of general structure wherein
$R^x$ is an organic group having a chain length of at least 8 atoms,
$n_1$ is the number of first repeating units in the polyester.

2. The polymer composition according to claim 1 wherein the polyester is a copolyester and further comprises second repeating units of general structure wherein
$R^y$ is different from $R^x$ and is an organic group having a chain length of at least 1 atom,
$n_2$ is the number of second polyester units in the polyester,
$n_1$ and $n_2$ is such that the average chain length of $R^x$ and $R^y$ is at least 8 atoms.

3. The polymer composition according to claim 1 wherein $R^x$ and/or $R^y$ is a substituted or unsubstituted, straight or branched, aliphatic chain.

4. The polymer composition according to claim 2 wherein the copolyester is a random copolyester, a gradient copolyester, an alternating copolyester, a block copolyester or a multi-block copolyester.

5. The polymer composition according to claim 1 wherein said polyester is obtained by a ring opening polymerisation of one or more cyclic esters having an average ring size of at least 10 atoms.

6. The polymer composition according to claim 5 wherein one or more of the one or more cyclic esters is a lactone.

7. The polymer composition according to claim 1 wherein the atoms of the organic group $R^x$ and/or $R^y$ having a chain length are carbon atoms.

8. The polymer composition according to claim 1 wherein the polyolefin is polyethylene.

9. The polymer composition according to claim 1 wherein the polyester is selected from the group consisting of poly (11-undecalactone), poly(12-dodecalactone), poly(13-tridecalactone), poly(14-tetradecalactone), polypentadecalactone, poly-globalide, poly(16-hexadecalactone), poly-ambrettolide, poly(17-heptadecalactone), poly(18-octadecalactone), and poly(19-nonadecalactone).

10. The polymer composition according to claim 1 comprising from 5-95 wt % of said polyolefin and from 95-5 wt % of said polyester, based on a total weight of the composition.

11. The polymer composition according to claim 1 wherein said composition is homogeneous.

12. The polymer composition according to claim 1 wherein the polyester is a semi-crystalline polyester.

13. An article comprising the polymer composition of claim 1.

14. A multilayer film comprising a film layer comprising the polymer composition of claim 1.

15. A packaging article comprising the multilayer film of claim 14.

16. The packaging article of claim 15, wherein the article is a food packaging article.

17. An article comprising the polymer composition of claim 2.

18. A multilayer film comprising a film layer comprising the polymer composition of claim 2.

19. A packaging article comprising the multilayer film of claim 18.

20. The packaging article of claim 19, wherein the article is a food packaging article.

\* \* \* \* \*